United States Patent [19]

Ouyang et al.

[11] Patent Number: 5,572,511
[45] Date of Patent: Nov. 5, 1996

[54] AUTO-ADJUSTMENT CIRCUIT FOR COLLISION DETECTION OF ETHERNET

[75] Inventors: Kenneth W. Ouyang, Taipei; Yin-Kung Huang, Ta-Yuan Hsiang; Phil Shieh, Taipei, all of Taiwan

[73] Assignee: Tamarack Microelectronics, Inc., Taipei, Taiwan

[21] Appl. No.: 378,824

[22] Filed: Jan. 27, 1995

[51] Int. Cl.$^6$ ................................................ H04L 12/413
[52] U.S. Cl. .......................... 370/13; 370/85.3; 370/94.1
[58] Field of Search ................................ 370/13, 60, 79, 370/85.1, 85.2, 85.3, 85.6, 85.13, 94.1, 94.3; 340/825.06, 825.5, 825.51

[56] References Cited

U.S. PATENT DOCUMENTS 4,345,250  8/1982  Jacobsthal .......................... 370/85.2
4,679,193  7/1987  Jensen et al. ....................... 370/94.1
5,079,766  1/1992  Richard et al. ..................... 370/85.3
5,355,375  10/1994  Christensen ....................... 370/85.3

*Primary Examiner*—Alpus H. Hsu

[57] ABSTRACT

A circuit for collision detect of ethernet mainly includes a comparator, a controlling logic, level adjusters, collision counters and a packed length detector. The collision counter is used to detect a collision frequency of Ethernet data transmission. When the collision detector makes any error in collision detection, the controlling logic will drive the level adjusters to adjust the collision level signal up or down to provide more accurate collision detection. An additional packet length detector is used for detecting the length of data packets, so that abnormal short packets can be detected and, if so, a collision signal can be sent in the network.

1 Claim, 3 Drawing Sheets

AUTO-ADJUSTMENT CIRCUIT FOR COLLISION DETECTION OF ETHERNET

BACKGROUND OF THE INVENTION

The invention is related to an auto-adjustment circuit for collision detection on an Ethernet network, and especially relates to improving detection of collision signals between nodes in an Ethernet network. By the use of the auto-adjustment circuit of the present invention, the detection of data collision is more accurate so that miss detection of network transmission that affect the operation of whole network is avoided. Meanwhile, the invention can also prevent error situations that occur because of ambient temperature and production processes.

Ethernet is a type of area network that provides data transmission between computers (nodes), as shown in FIG. 1. Before users, named as A, B, C, D, E, transmit their data, Ethernet monitors whether any other user is using Ethernet or not. If not, then transmission of data is started. A detection circuit exists for detecting collisions because data may be transmitted simultaneously in some cases. The IEEE specifications definition 802.3 sets forth a detection level of a well-known detection circuit for Ethernet. However, the gap between the detection signal and the detection level is very narrow. The detection method is shown in FIG. 2, where a representation of the detection level defined in 802.3 is set forth. The detection signal 20, which represents data collision, produces a under-level pulse (dash-dot-dot line) to let all users (computers) realize that data collision has occured. If the data signal 20 does not dip under the detection level (i.e., solid line), no occurrence of data collision is indicated. However, due to the influence of ambient conditions and the variation of mass production, the following situations can occur:

(1) if the detection signal is very close to the 802.3, level or is even under this level, users (computers) may not detect that data collision has occurred.

(2) if the gap between the detection signal 20 and the detection level 802.3 is too large, the detection signal 20 may not dip under the detection level even if data collision has occurred, so it will misguide users (computers) to determine that no data collision occurred and mistakes will be made during data transmission.

Both these situations are troublesome and inconvenient for Ethernet usage. They may be all right for transmit mode collision detection. But for receive mode collision detection, errors will result. There is no good way to solve the above-mentioned problem in the market. Hence, the inventor devised this invention.

SUMMARY OF THE INVENTION

The invention provides a circuit for precise detection and automatic adjustment of the collision on Ethernet. It prevents users (computers) from detecting error signals on different nodes which will cause trouble and inconvenience of data transmission. The invention also it raises the yield rate, lowers costs, and increases the reliability. There are the main purpose of the present invention.

According to the auto-adjustment circuit for collision detection on Ethernet of the invention, the occurrence of an abnormal short packet is also detected which produces accurate collision detection for the transmitter (so called transmit mode collision detection). By means of packet length detection, an accurate receive mode collision detection can be provided which is, normally difficult to provide reliably. This is the second purpose of the present invention.

In order to reach these purposes, the invention is mainly comprised of a comparator, a controlling logic, level adjusters, collision counters, and a packet length detector. The invention uses collision counters to record the times a collision occurs on the network, which is connected to a controlling logic for controlling the level adjusters. When used on Ethernet by means of the detection of collision counters, the invention can realize whether there is an abnormal collision situation or not. If an abnormal collision is detected, the invention then drives the controlling logic and level adjuster to automatically and properly adjust the collision signal level by increasing or decreasing the signal based on the detect situation, so that the collision detection of Ethernet is more accurate. Additionally, a packet length detector is used for receive mode collision detection. Even under the worst situation, such as the collision comparator does not detect any collision, the special packet length detector detects all packets on the network. If any packet length is lower than a normal length (for instance, smaller than 128 bits, runt packet), the invention indicates a collision has occurred.

The detail structure, application principle, function and effect of the invention can be realized after reading the following detailed description of appended drawing.

DETAILED DESCRIPTION OF THE PREFERRED EMBODIMENTS OF PRESENT INVENTION

Figure 1:
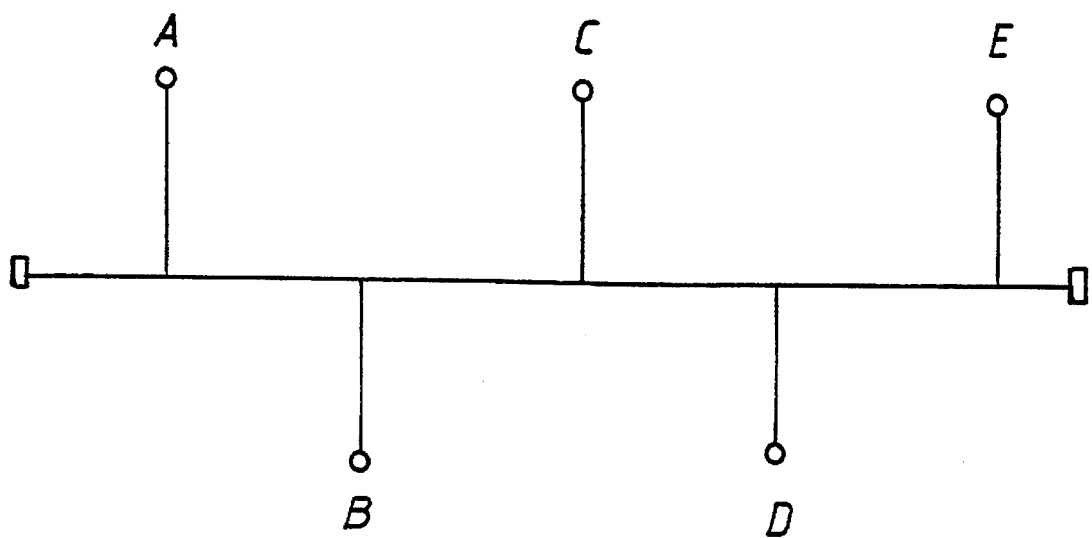
FIG. 1 is the usage diagrammatic sketch of Ethernet.
Figure 2:
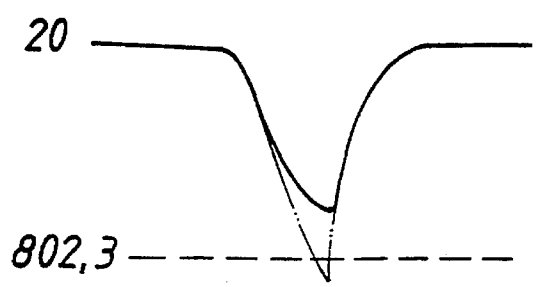
FIG. 2 is the diagrammatic sketch of the collision level of ethernet.
Figure 3:
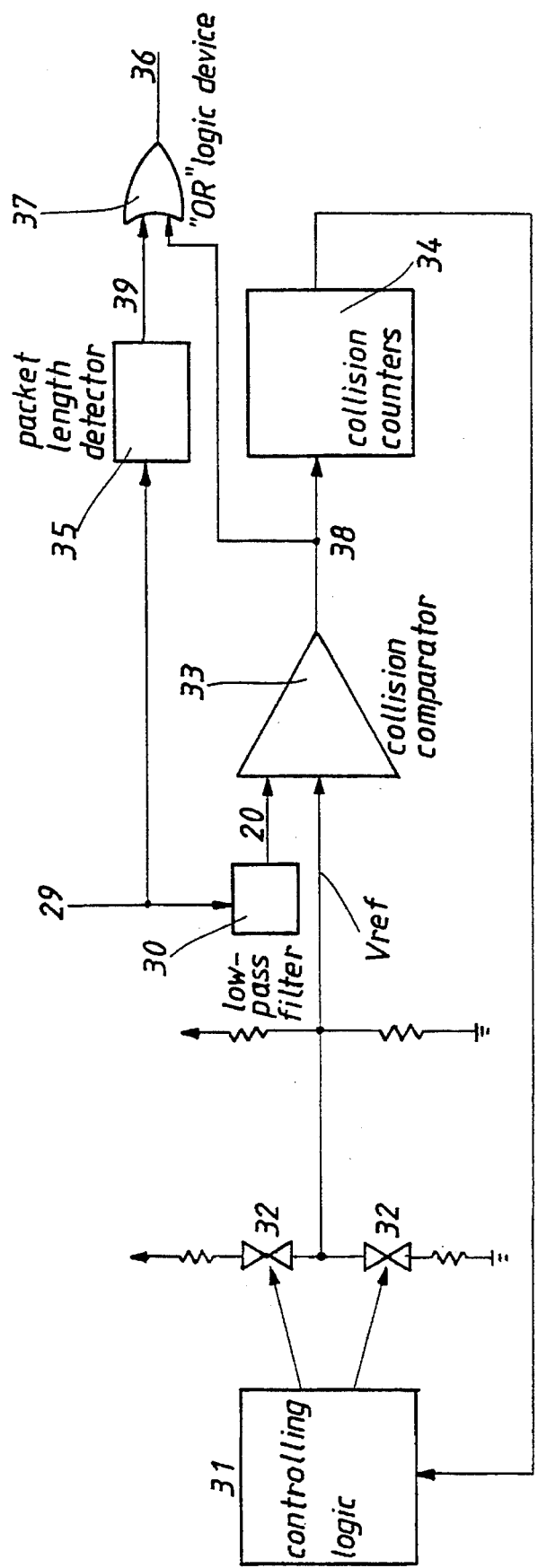
FIG. 3 is the block diagram of the invention.
Figure 4:
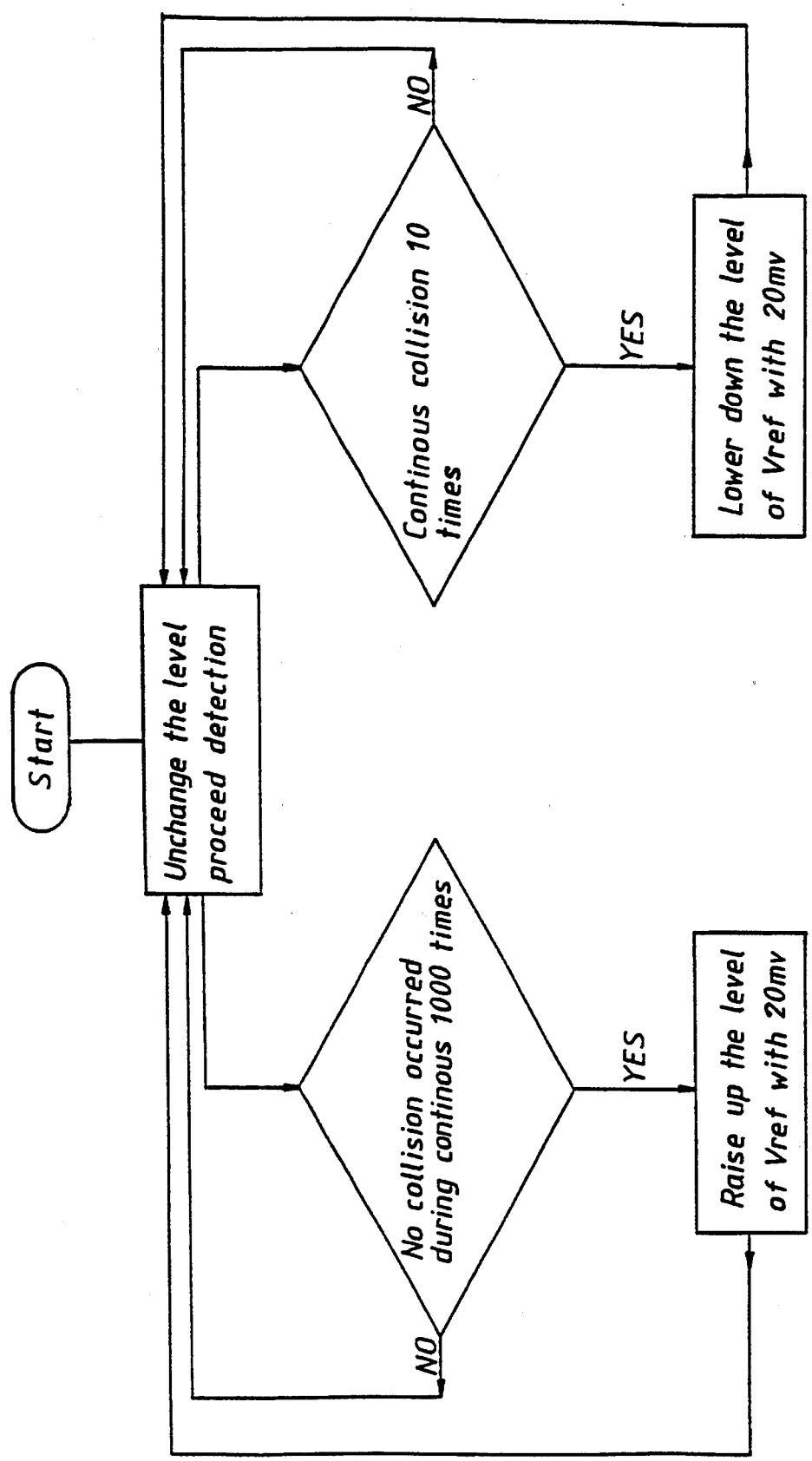
FIG. 4 is the flowchart for collision detection of the invention.

The block diagram of the invention is shown in FIG. 3. The invention comprises a voltage comparator 33, a low pass filter 30, collision counters 34, a controlling logic 31, two level adjusters 32, a packet length detector 35, and an "ON" logic device 37. The collision counters 34 is connected to controlling logic 31, then the controlling logic 31 is connected to level adjusters 32 that adjust the collision level signal $V_{ref}$. Thereafter, the adjusted collision level signal is sent to the collision comparator 33 to determine if a collision has occured, and then the process is repeated. Referring to FIGS. 3 and 4, a detection method using the present invention is explained. An input signal 29 from the network is received in the low-pass filter 30, which outputs the remaining low-frequency signal of low voltage 20 to the collision comparator 33. The collision counters 34 detect whether there is a continuous non-collision (for example: 100 times, N times). If so, the controlling logic and level adjusters 32 raise the signal level up V1 (for example: 20 mV). If the collision counters 34 detect no such result (i.e, at least once collision in N times transmission), the controlling logic 31 holds the signal level and then proceeds again to the operation of collision direction. In addition, the invention also uses the collision counters 34 to detect whether there are M times continuous collisions or not (for example: 10 times). If this situation occurs, the controlling logic 31 and level adjusters 32 lower the signal level down V2 (for example: 20 mV) and then proceed again to the operation of signal level detection. In the receive situation, because the collision signal is weaker, the collision comparator 33 may make a mistake. For this reason a packet length detector 35 (simple bit counter) is specially appended in the invention, and by use of logic method, the invention compensates for a possible missed collision detection. At last, the output of comparator 38 and the output 39 of the packet length detector 35 is fed to an OR gate, that outputs the final synthetic collision report 36. By means of this circuit and method, the collision detection of Ethernet can be ingeniously adjusted according to changes in the situation of its operation, so that its usage will be more accurate and more convenient. In short, the auto-adjustment circuit for collision detection of Ethernet in the present invention can detect collisions very accurately for data transmission of Ethernet, so that data transmission will be more fluent and is a new and useful invention.

What is claimed is:

1. An auto-adjustment circuit for collision detection of an Ethernet IEEE 802.3 network comprising a low-pass filter, a packet length detector, a collision comparator, collision counters, a controlling logic, level adjustors, and an OR gate;

said packet length detector receiving a signal from the network, and outputting to said OR gate a short packet length signal when a packet length of any signal on the network is lower than a normal length;

said low-pass filter receiving said signal from said network, filter said signal and sending a filtered signal to said collision comparator;

said collision comparator comparing said filtered signal to a reference voltage, determining if a collision signal has occurred, and outputting a result as a "collision" or "no collision" signal to said OR gate and said collision counters;

said collision counters receiving said "collision" and "no collision" signals from said comparator, and outputting an increase voltage signal when no collision has occured for a predetermined number of times, outputting a decrease voltage signal when a continuous collision has occurred a predetermined number of continuous times, and otherwise outputting a hold voltage signal;

said controlling logic receiving said increase, decrease and hold voltage signals, and controlling said level adjusters to increase, decrease, or hold voltage of said reference voltage respectively in response to said increase voltage signal, said decrease voltage signal, and said hold voltage signal; and said OR gate outputting a collision report signal of true when receiving either said "collision" signal from said collision comparator or said short packet signal from said packet length detector.

\* \* \* \* \*